(12) United States Patent
Talesky

(10) Patent No.: US 7,156,008 B2
(45) Date of Patent: Jan. 2, 2007

(54) FLIP-UP MULTI-MODE WORKPIECE STOP FOR MITER SAW

(75) Inventor: Mark S. Talesky, Huntley, IL (US)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 10/857,384

(22) Filed: May 28, 2004

(65) Prior Publication Data

US 2005/0262985 A1 Dec. 1, 2005

(51) Int. Cl.
*B26D 7/02* (2006.01)

(52) U.S. Cl. .................. 83/468.2; 83/581; 83/468.6

(58) Field of Classification Search .............. 83/581, 83/468.2, 468.3, 471.3, 468.6, 468.7
See application file for complete search history.

(56) References Cited

U.S. PATENT DOCUMENTS

| | | | | |
|---|---|---|---|---|
| 544,092 A | * | 8/1895 | Goodell | 83/760 |
| 4,346,636 A | * | 8/1982 | Taylor | 83/767 |
| 4,875,399 A | * | 10/1989 | Scott et al. | 83/468.3 |
| 5,644,964 A | * | 7/1997 | Price | 83/459 |

OTHER PUBLICATIONS

Photo of Commercial CRAFTSMAN Product (date uknown; believed to be available prior to Apr. 7, 2004).
Photo of Commercial DEWALT Product (date uknown; believed to be available prior to Apr. 7, 2004).
Photo of Commercial BOSCH Product (date uknown; believed to be available prior to Apr. 7, 2004).

* cited by examiner

*Primary Examiner*—Kenneth E. Peterson
*Assistant Examiner*—Isaac N Hamilton
(74) *Attorney, Agent, or Firm*—Maginot, Moore & Beck

(57) ABSTRACT

A workpiece stop is provided for a power tool such as a miter saw, wherein the stop is selectively movable to various positions for respective modes of operation. In one position, the stop is stored out of the way during non-use. In another position, the stop acts as a length-of-cut stop. In yet another position, the stop acts as a workpiece guide, especially useful for supporting crown molding during cutting. An embodiment of the stop includes an elongate main body portion with a guide tab portion and a stop tab portion projecting from the main body portion, and the stop is preferably mounted for selective movement both slidably and pivotally. Depending on the position of the stop, the guide tab portion or the stop tab portion are positioned to project adjacent a workpiece support surface on the saw to limit a position of a workpiece.

33 Claims, 7 Drawing Sheets

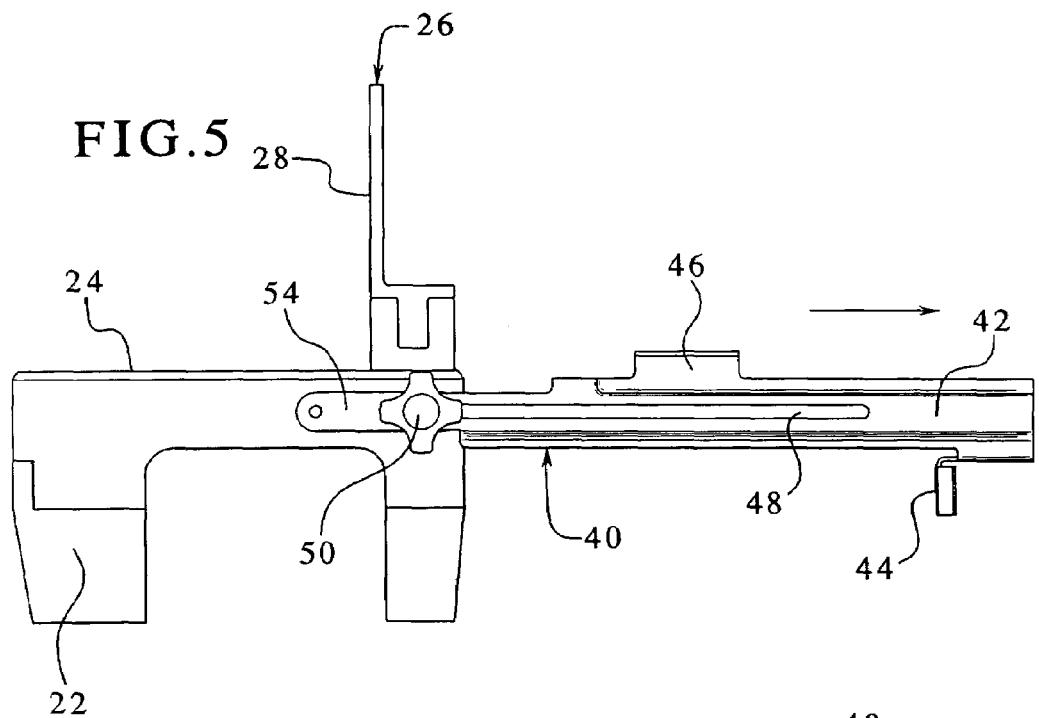
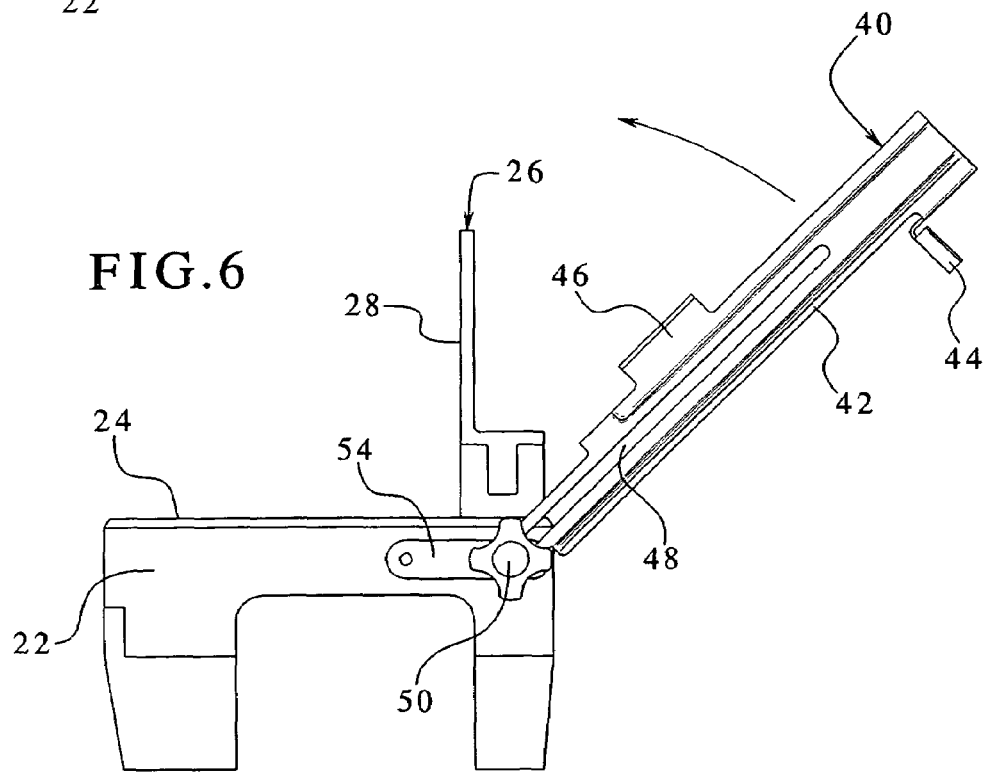

FLIP-UP MULTI-MODE WORKPIECE STOP FOR MITER SAW

FIELD OF THE INVENTION

The invention generally relates to power saws and more particularly relates to saws having workpiece stop and guide mechanisms.

BACKGROUND OF THE INVENTION

Miter saws are generally known for cutting wood. Conventional miter saws provide a horizontal workpiece support surface and a vertical fence for supporting a workpiece during sawing.

It is also known to mount a stop member to limit the position of a workpiece placed on the support surfaces. One known type of stop member sets a predetermined distance from the blade to permit cutting of a workpiece to a predetermined length. The stop member is typically mounted on an extendable structure so that the cut length can be adjusted as desired.

Another known type of stop acts as a guide for supporting a crown molding workpiece. Miter saws are commonly used for cutting corners on crown molding, a task that may require a compound cut angle. Due to the cross sectional shape of crown molding, it has been necessary to provide a guide disposed a distance forwardly of the fence to support a front edge of the crown molding in order to hold the crown molding at an appropriate position. The guide is positioned at a predetermined distance forwardly of the fence to support crown molding at an appropriate angle as it rests against the fence for cutting.

It is desirable to provide a miter saw that includes a stop useful to set a predetermined workpiece cut length and that also includes a guide tab useful to appropriately hold crown molding. Additionally, a need exists for an improved stop for a miter saw that provides easy selection and adjustment of a stop tab and a guide tab.

BRIEF SUMMARY OF THE INVENTION

In an embodiment, the invention provides an improved miter saw having a multi-mode workpiece stop. Preferably, the stop is operable in one mode as a length-of-cut stop and in another mode as a crown molding guide, wherein the stop can be switched between these modes with a "flip-up" motion.

For example, according to an embodiment, a miter saw is provided comprising a stationary base having a generally horizontal workpiece support surface and a fence mounted to the base. The fence has a planar, vertically-oriented workpiece support surface that extends in a direction along a horizontal workpiece axis, and the horizontal workpiece support surface extends horizontally from the fence in a forward direction. The miter saw also includes a saw unit that is mounted to the base for relative movement, and the saw unit has a circular saw blade for cutting a workpiece. Furthermore, the miter saw includes a stop comprising a main body portion, a guide tab portion extending from the main body portion, and a stop tab portion extending from the main body portion. The main body portion is mounted for selective movement relative to the base among multiple positions including: (a) a first position, or "storage position," in which both the stop tab portion and guide tab portion are free from the workpiece support surfaces so as to permit free positioning of a workpiece on the workpiece support areas; (b) a second position, or "workpiece stop position," operable as an end stop wherein the stop tab portion projects perpendicularly to at least one of the workpiece support surfaces to limit a position of an end of a workpiece along the workpiece axis; and (c) a third position, or "workpiece guide position," operable as a crown molding guide wherein the guide tab portion projects upwardly from the horizontal workpiece support surface, the guide tab portion opposing the fence, spaced a distance forwardly of the fence, effective to support an edge of a workpiece at a predetermined distance forwardly of the fence.

In an embodiment, the main body portion is mounted to the base for selectively slidable relative movement. In a related embodiment, the stop is movable from the first position to the second position by sliding the stop forwardly.

In an embodiment, a fastener is provided to selectively secure the stop in a desired position relative to the base. For example, in an embodiment wherein an elongate slot is disposed through the main body portion, the fastener may be a threaded mounting bolt that extends through the slot and that is received within a threaded bore in the base, wherein the fastener is selectively tightenable to secure the stop relative to the base.

In an embodiment, the main body portion is cooperatively shaped to fit against the base to hold the stop in a manner such that the slot is generally horizontal. In a related embodiment, the main body portion includes an elongate channel and the base includes at least one ridge shaped to cooperatively fit within the channel. The slot is disposed parallel to and within the channel, and the stop can slidably adjust along the ridge. Alternatively, a channel is disposed in the base and the stop cooperatively fits with the channel.

In an embodiment, when the stop is in the third position, the stop is selectively slidable to position the guide tab at a desired distance forwardly of the fence.

In an embodiment, the stop is mounted to the base for selectively pivotable movement.

In an embodiment, the stop is movable between the first position and the third position by pivoting the stop forwardly 180 degrees.

In an embodiment, the stop is movable between the second position and the third position by pivoting the stop forwardly 180 degrees.

An advantage of the present invention is that it provides an improved stop for a miter saw.

Another advantage of the present invention is that it provides a stop that is operable in multiple modes. In an embodiment, a further advantage of the present invention is that it provides a stop for a miter saw, wherein the stop moves out of the way of workpiece support surfaces, when desired, in order to not limit the position of a workpiece.

In an embodiment, an advantage is that the stop is mounted for slidable and pivotable movement to permit quick selection between modes of operation and ease of adjustability.

These and other advantages of the invention will be apparent from the description of the invention provided herein.

BRIEF DESCRIPTION OF THE DRAWINGS

FIG. 5 is a fragmentary side elevation of the miter saw illustrating the stop slid rearwardly in preparation for adjustment between the first and third positions.

FIG. 6 is a fragmentary side elevation of the miter saw illustrating the stop being "flipped" or pivoted forwardly toward the third position.

In FIG. 10, the stop is adjusted so that the guide tab is positioned a greater distance from the fence than in FIG. 9.

DETAILED DESCRIPTION OF THE INVENTION

Figure 1:
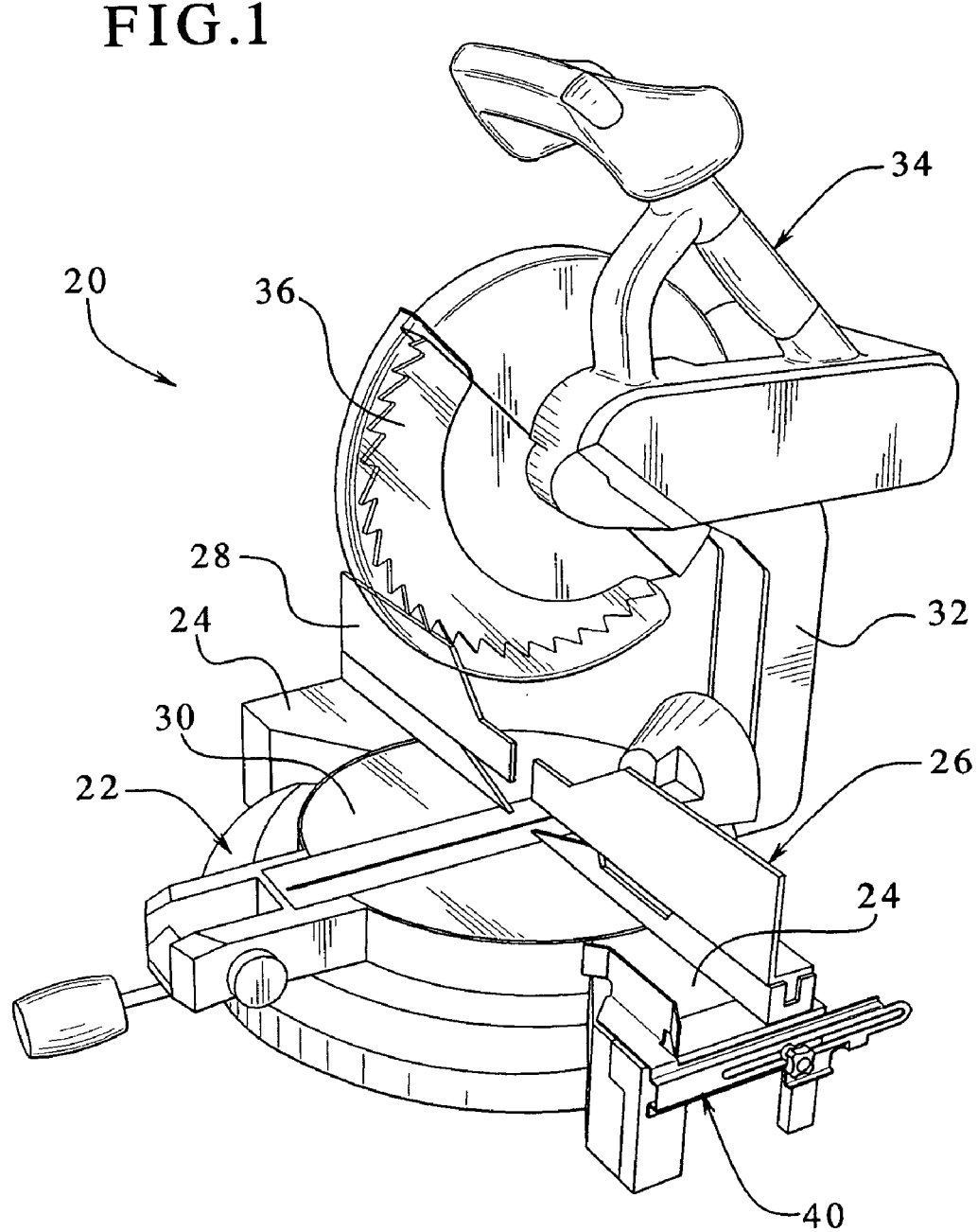
FIG. 1 is a perspective view of a miter saw including a stop constructed in accordance with teachings of the present invention.
Figure 2:
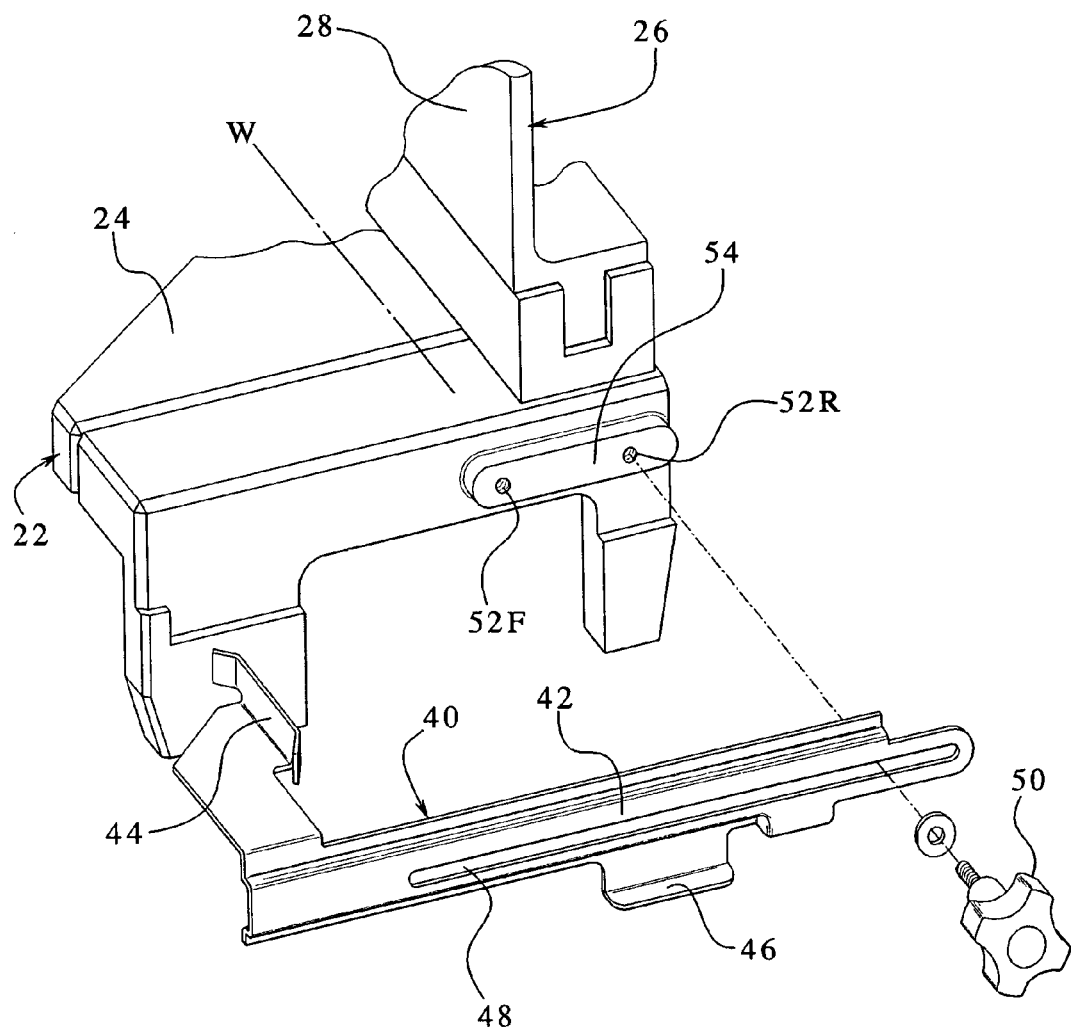
FIG. 2 is an exploded, fragmentary, perspective view of the miter saw of FIG. 1, illustrating the stop.

Now referring to the drawings, wherein like numerals designate like components, FIG. 1 illustrates a miter saw 20. The miter saw 20 includes a base 22 having a generally planar, horizontal workpiece support surface 24. A fence 26 is mounted to the base 22, the fence 26 having a generally planar, vertical workpiece support surface 28. A workpiece support axis W (FIG. 2) generally extends horizontally parallel to the fence 26.

The miter saw 20 further includes a table 30 that is rotatably mounted to the base 22, and an arm 32 is mounted to a rear of the table 30. The arm 32 holds a saw unit 34 with a circular blade 36. The table 30 is rotatably adjustable relative to the fence 26, so that the table (and saw unit mounted thereon) can be angularly positioned to set a desired miter cut angle. The arm 32 is pivotably mounted to permit the saw unit 34 to be moved toward downward to cut a workpiece on the support surface 24. Preferably, the arm 32 is mounted to permit a lateral angular adjustment to tilt the blade 36 to a desired compound cut angle.

According to an aspect of the invention, the miter saw includes a workpiece stop that is operable in multiple modes. In one mode, the stop is operable as a length-of-cut stop, and in another mode the stop is operable as a crown molding guide, and the stop can be switched between these modes with a "flip" motion. In a further mode, the stop is positioned out of the way when not in use.

For example, as illustrated in FIGS. 1–11, the miter saw has a stop 40. The stop 40 is pivotally mounted to the base 22 near an end of the fence 26. In the illustrated embodiment, as can be viewed in FIGS. 2–11, the stop 40 includes a main body portion 42, a guide tab portion 44 that extends from the main body portion, and a stop tab portion 46 that extends from the main body portion. The stop 40 is mounted to the base in a manner that permits it to be selectively positioned.

A fastener 50 is provided to selectively secure the stop 40 relative to the base in a desired position. For example, in the illustrated embodiment, the fastener 50 is a threaded mounting bolt. In such embodiment, an elongate slot 48 is disposed through the main body portion 42 to facilitate selective positioning of the stop 40 relative to the base 22 with either a sliding or pivotal motion. Also in the embodiment wherein the fastener 50 is a bolt, the fastener extends through the slot 48 and is received within a threaded bore 52R in the base 22. The fastener 50 is selectively tightenable to press the main body portion 42 against the base 22, thereby securing the stop 40 in a fixed position relative to the base. When the fastener 50 is loosened so as to relieve friction between the main body portion 42 and the base 22, the stop 40 is slidably movable on the fastener 50, which glides within the slot 48. It will be appreciated that the fastener 50 could be any one of a variety of structures, and it is not limited to the bolt illustrated. For example, the fastener 50 could alternatively be a cam device, a clip, or any device operable to secure the stop 40 relative to the base 22, preferably in a quick-change manner.

Figure 11:
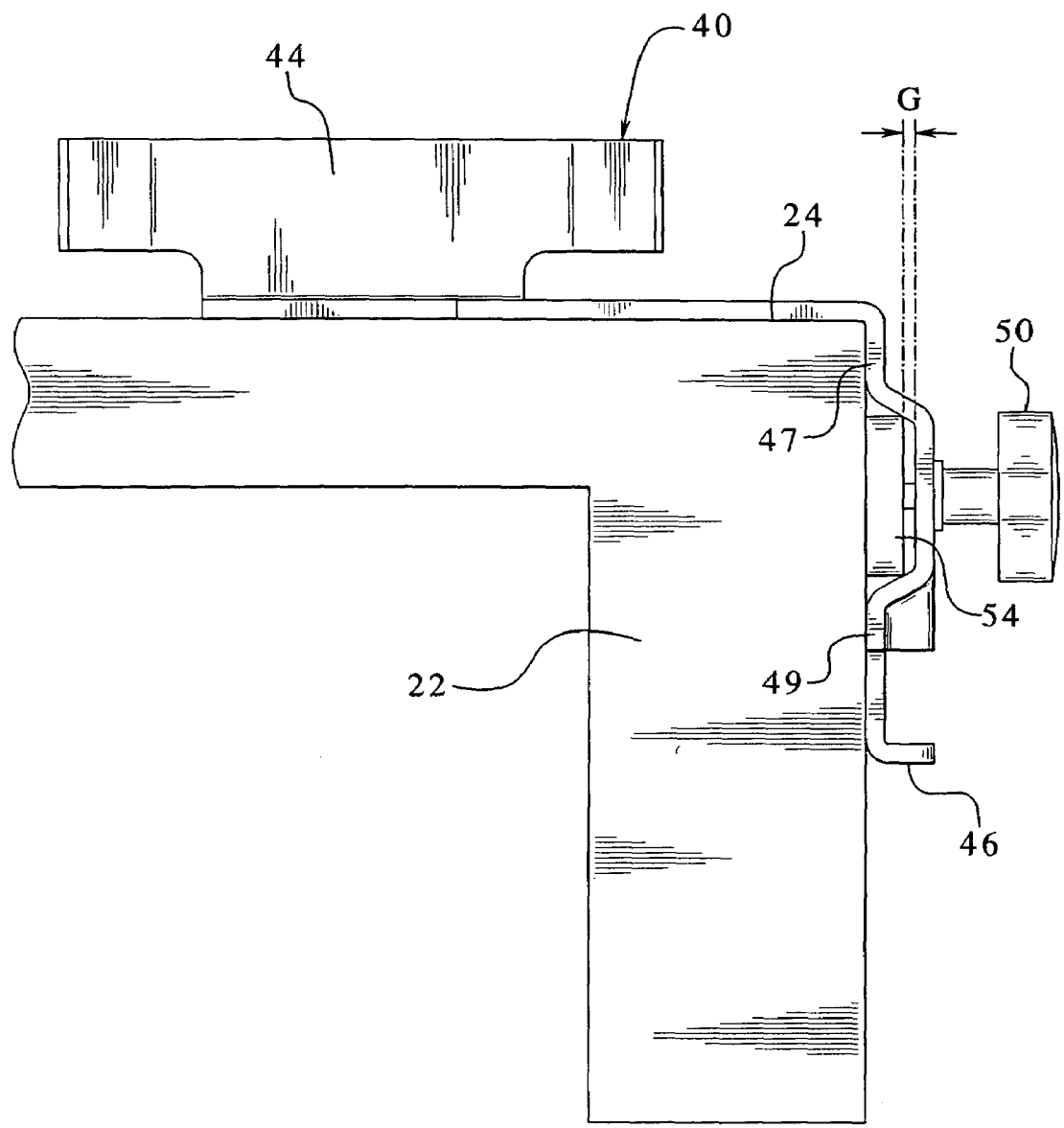
FIG. 11 is a fragmentary front elevation of the miter saw illustrating the stop in the third position.

In order to maintain proper alignment of the stop 40 during a slidable adjustment, the main body portion 42 is preferably shaped to cooperatively fit against the base to hold the stop in a manner such that the slot is generally horizontal. In the illustrated example, the main body portion 42 has a generally elongate, channel-like shape. Turning to FIG. 11, the main body portion 42 is shaped to form elongate rails 47 and 49, defining the channel. Additionally, the base 22 includes at least one ridge 54 shaped to cooperatively fit within a concave portion of the channel, as illustrated in FIG. 11, in a manner that guides the stop 40 for horizontal slidable movement. FIG. 11 illustrates that the ridge 54 fits within the channel in contact with the upper and lower rails 47, 49, to provide support that maintains the desired orientation. Alternatively, a channel is disposed in the base and the stop cooperatively fits with the channel.

FIG. 11 also illustrates that the stop 40 is preferably dimensioned to form a gap G between the ridge 54 and the main body portion 42. The gap G ensures that the mounting contact is transferred through the rails 47, 49. Thus, when the fastener 50 is tightened against an outer surface of the main body portion 42, the rails 47, 49 contact firmly against the base 22 respectively above and below the ridge 54, securing the stop 40 in the desired position.

Figure 3:
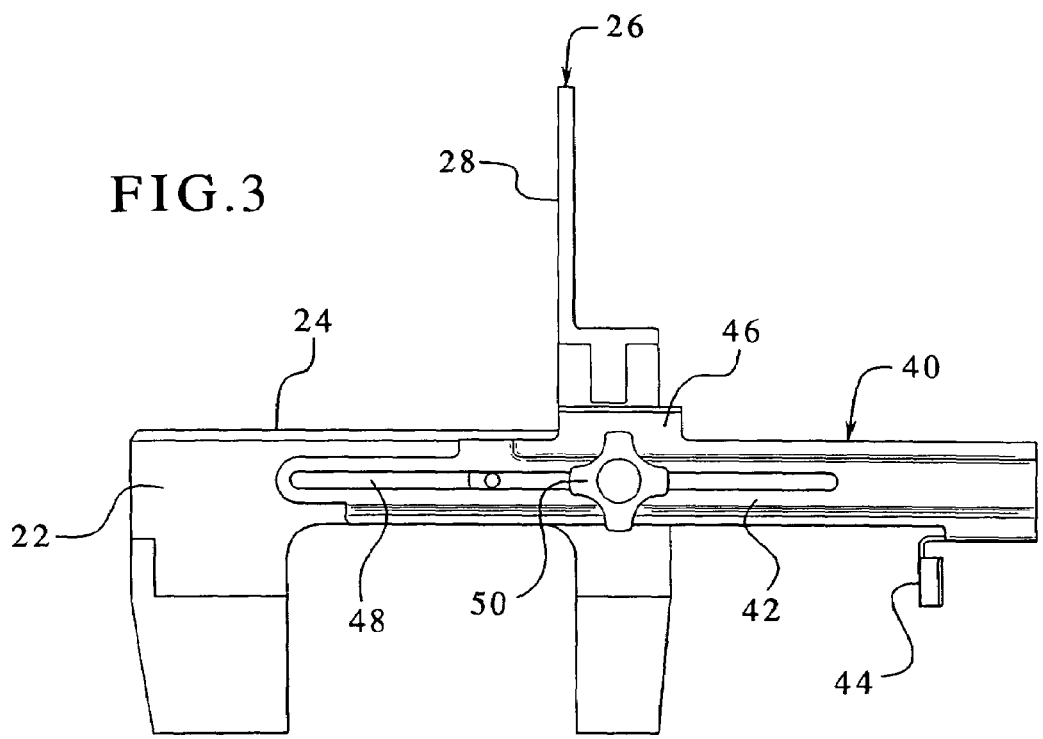
FIG. 3 is a fragmentary side elevation of the miter saw illustrating the stop in a first position for out-of-the-way storage during non-use, wherein the stop tab portion and guide tab portion are free from the workpiece support surfaces to not limit the position of a workpiece.

When the stop 40 is in a storage mode and not being used, the stop is secured in a first position as illustrated in FIG. 3. In the first position, both the stop tab portion 46 and guide tab portion 44 are free from the workpiece support surfaces 24, 28 so as to permit free positioning of a workpiece on the workpiece support surfaces. The stop tab portion 46 is directed upwardly and is positioned at least flush with (shown), or rearwardly of, the vertical workpiece support surface 28 of the fence 26. The guide tab portion 44 is downwardly directed downwardly from a rearmost end of the stop 40, well out of the way of the workpiece support surfaces 24, 28.

Figure 4:
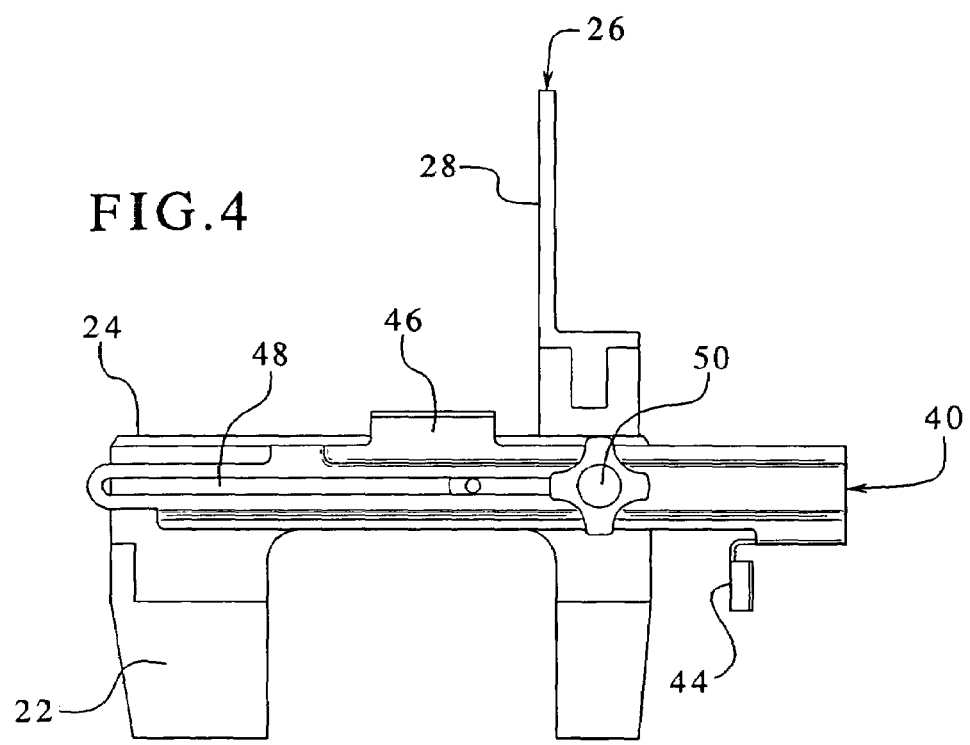
FIG. 4 is a fragmentary side elevation of the miter saw illustrating the stop in a second position, slid forwardly of the first position, wherein the stop tab portion projects from the workpiece support surface, operable to stop a workpiece thereby set a desired cut length.

In order to use the stop 40 in an end stop mode, the stop is placed in a second position, as illustrated in FIG. 4. In the second position, the stop tab portion 46 is positioned forwardly of the vertical workpiece support surface 28 of the fence 26 and projects perpendicularly upwardly above the horizontal workpiece support surface 24 of the base 22. In this position, the stop tab portion 46 will abut a workpiece that is positioned on the workpiece support surface 24. As a result, the stop tab portion 46 sets a predetermined distance from the blade 36 to permit cutting of a workpiece to a predetermined length between the blade and the stop tab portion 46. The stop 40 is easily movable between the first position (FIG. 3) and the second position (FIG. 4) with a horizontal sliding action while the stop 40 maintains a consistent orientation. The guide tab portion 44 remains out of the way of the workpiece support surfaces and is not used in the position of FIG. 4.

In a preferred embodiment, the base 22 and fence 26 are constructed in an outwardly extendable manner (see FIG. 2), so that the workpiece support surfaces 24, 28 can be extended in a direction of the workpiece axis W. The stop 40 is mounted on an end of the base 22, and therefore, the stop tab portion 46 is outwardly extended at the same time to permit adjustment of the cut length.

Figure 7:
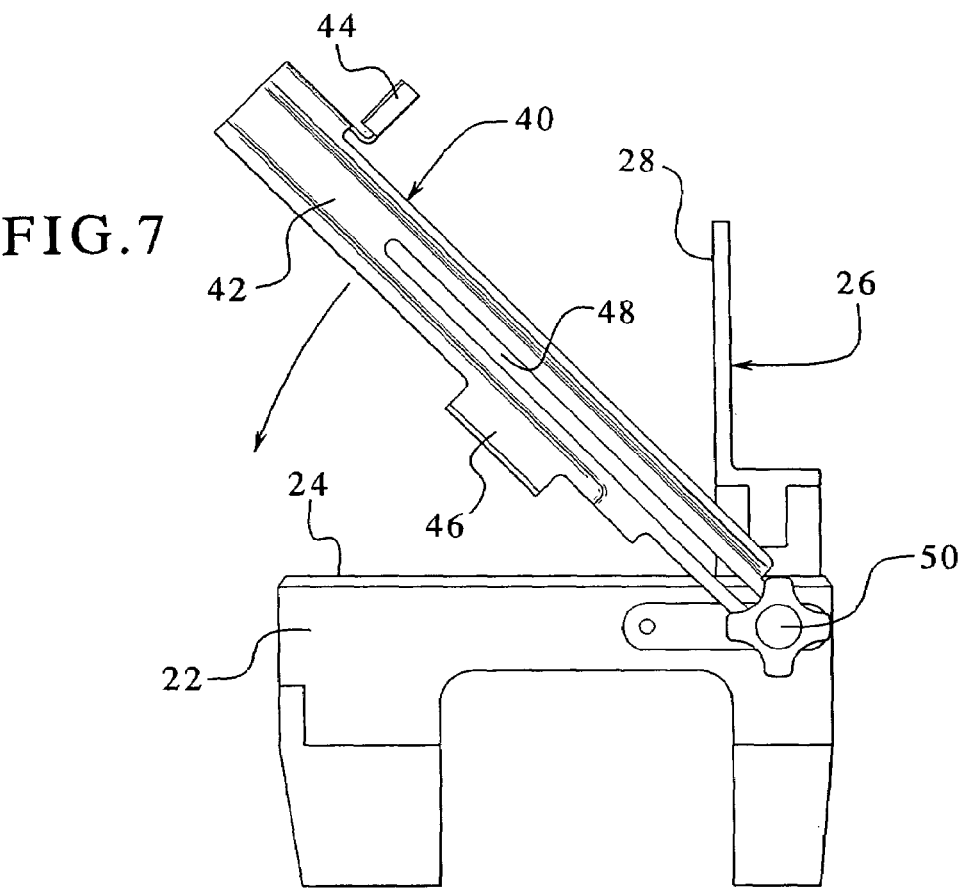
FIG. 7 is a fragmentary side elevation of the miter saw illustrating the stop being "flipped" or pivoted forwardly toward the third position.
Figure 8:
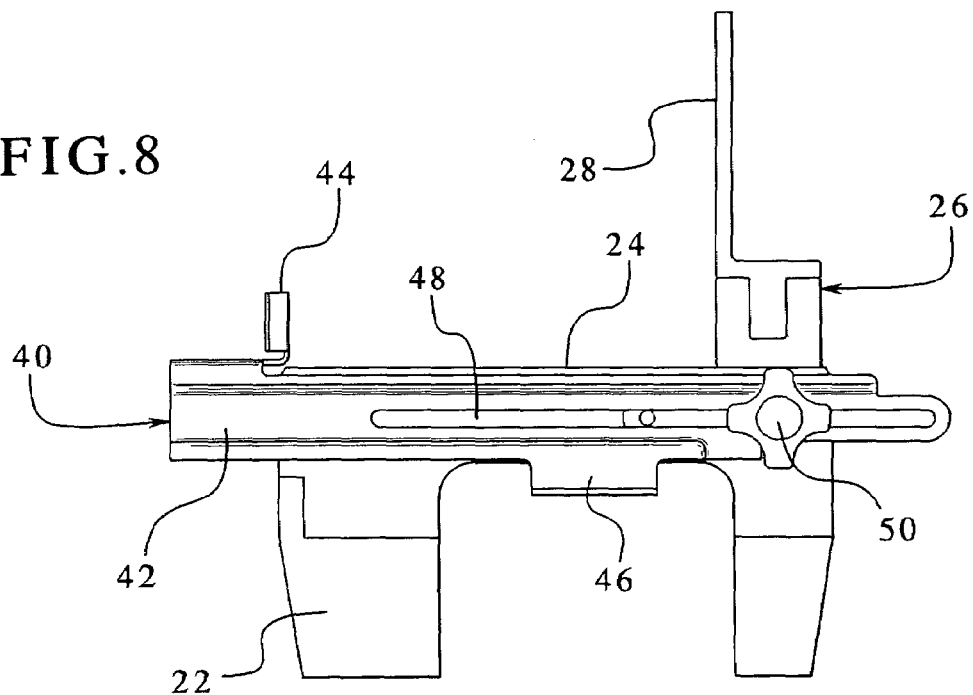
FIG. 8 is a fragmentary side elevation of the miter saw illustrating the stop in the third position wherein the guide tab is positioned parallel to the fence, spaced a distance forwardly of the fence.

In a mode wherein the stop 40 serves as a crown molding guide, the stop is placed in a third position as illustrated in FIG. 8. Preferably, the stop 40 is movable to the third position with a "flip-up" action wherein the stop is pivoted about 180 degrees from its orientation in the first position (FIG. 3) or the second position (FIG. 4). The "flip-up" motion will be described with reference to FIGS. 5–8. From the first or second position, when the fastener 50 is loosened, a user can slide the stop 50 rearwardly as shown in FIG. 5. When the stop is pulled rearwardly, an end of the slot 48 hits the fastener 50, and the ridge 54 is free of the channel, permitting the stop to be pivoted. FIGS. 6 and 7 illustrate a forward pivot action of the stop 40, until the stop 40 finally reaches the horizontal orientation shown in FIG. 8, which is 180 degrees from the orientation of the stop in FIGS. 3 and 4 so that the guide tab portion 44 is at a forward end of the stop 40 and projects upwardly from the main body portion 42. Also, the guide tab portion 44 projects upwardly from the horizontal workpiece support surface 24, opposing the fence 26.

Figure 9:
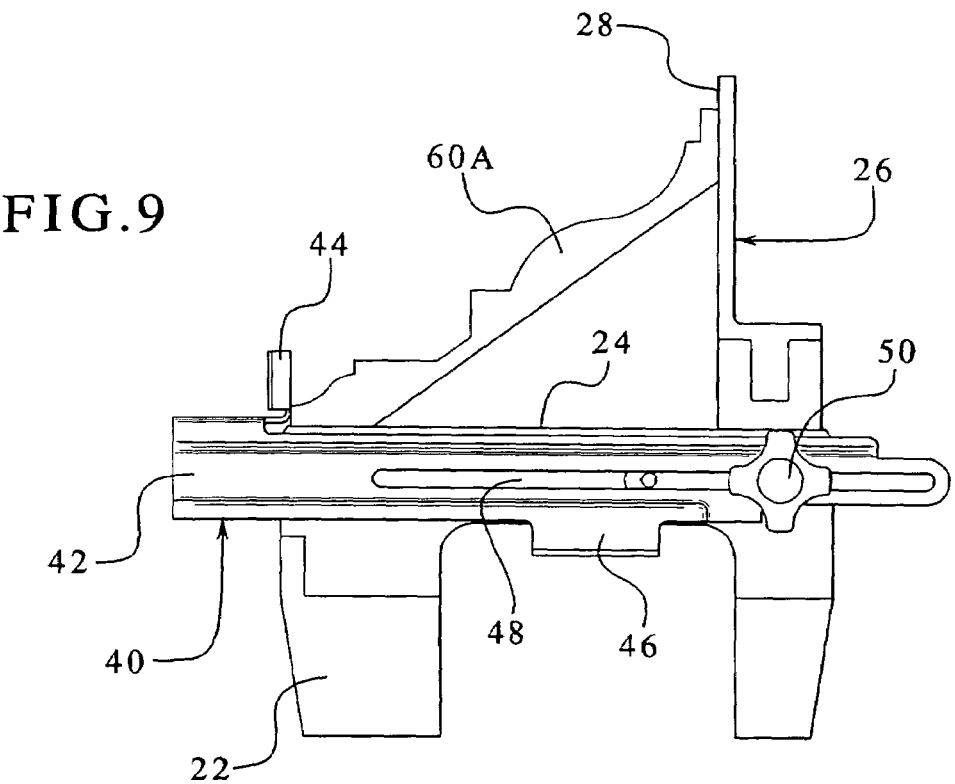
FIG. 9 is a fragmentary side elevation of the miter saw illustrating the stop in the third position, the guide tab being adjusted at a desired distance from the fence appropriate to hold a front edge of a small piece of crown molding during a cutting operation.
Figure 10:
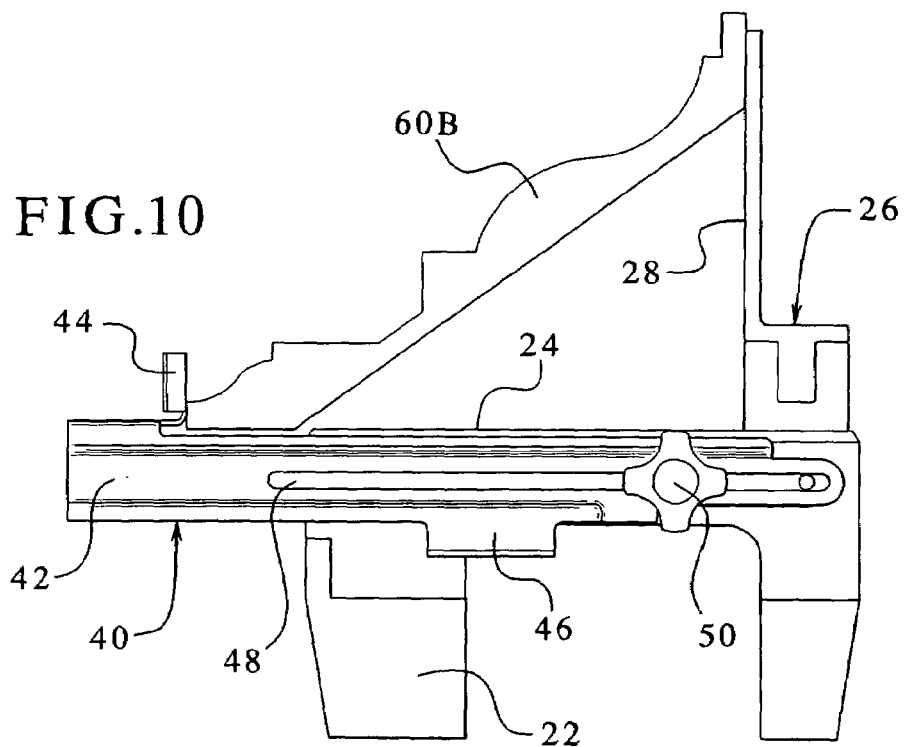
FIG. 10 is a fragmentary side elevation of the miter saw illustrating the stop in the third position, the guide tab being adjusted at a desired distance from the fence appropriate to hold a front edge of a large piece of crown molding during a cutting operation.

FIGS. 9 and 10 show the stop 40 in the third position and in use as a crown molding guide. In FIGS. 9 and 10, the guide tab portion 44 is spaced a desired distance forwardly of the fence, effective to support a front edge of a crown molding workpiece 60A at a predetermined distance forwardly of the vertical workpiece support surface 28 of the fence 26. By setting the stop 40 so that the slot 48 is a desired position on the fastener 50, the stop can be slidably adjusted within the third position to accommodate different workpiece sizes. For example, FIG. 9 shows the stop 40 positioned so that the guide tab portion guides a front edge of a small piece of crown molding. Moreover, the base preferably includes an auxiliary threaded bore 52F positioned forwardly of the threaded bore 52R. The fastener 50 may be tightened into the bore 52F (FIG. 2), instead of 52R (FIG. 2), in order to set the position of the guide tab portion 44 to accommodate a large sized workpiece 60B, as illustrated in FIG. 10. As shown in FIGS. 9 and 10, the stop tab portion 46 is directed downwardly, out of the way of the workpiece 60A, 60B, and is not used.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A miter saw assembly, comprising:
   a base having a generally horizontal workpiece support surface that defines a plane,
   said base further having an internally threaded bore defined therein;
   a fence supported by said base and having a generally vertical workpiece support surface;
   a cutting tool operable to cut a workpiece positioned on said generally horizontal workpiece support surface;
   a stop structure attached to said base and including a first tab member and a second tab member that are spaced apart from each other; and an attachment member having an externally threaded shaft configured to be meshingly received within said internally threaded bore;
   wherein said stop structure is movable between (i) a first position in which said first tab member is at least partially located above said plane P1 and all of said second tab member is positioned below said plane P1, and (ii) a second position in which said second tab member is at least partially located above said plane P1 and all of said first tab member is positioned below said plane,
   wherein said stop structure further includes an elongate body having a first side and a second side that is opposite to said first side of said elongate body, wherein said first tab member extends from said first side of said elongate body, said second tab member extends from said second side of said elongate body, wherein said elongate body has a slot defined therein, and wherein said attachment member extends through said slot when said attachment member is secured to said base.

2. The assembly of claim 1, wherein:
   said base further has a guide structure,
   said stop structure defines an elongate channel, and
   said guide structure is located within said elongate channel during linear movement of said stop structure.

3. The assembly of claim 2, wherein said guide structure is spaced apart from said elongate channel during pivoting movement of said stop structure in relation to said base.

4. The assembly of claim 1, wherein:
said generally vertical workpiece support surface of said fence defines a plane P2, and
when said stop structure is positioned at said first position, all of said first tab member is positioned on a first side of said plane P2.

5. The assembly of claim 4, wherein:
wherein said stop structure is further movable to a third position in which said first tab member is at least partially located above said plane P1 and all of said second tab member is positioned below said plane P1, and
when said stop structure is positioned at said third position, said first tab member is at least partially positioned on a second side of said plane P2 which is opposite to said first side of said plane P2.

6. The assembly of claim 5, wherein movement between said third position of said stop structure and said first position of said stop structure includes linear movement of said stop structure.

7. The assembly of claim 6, wherein movement between said third position of said stop structure and said second position of said stop structure includes pivoting movement of said stop structure.

8. The assembly of claim 1, wherein said attachment member is supported by said base continuously during the entire movement of said stop structure from said first position to said second position.

9. The assembly of claim 1, wherein said attachment member moves in relation to said slot in response to movement of said stop structure from said first position to said second position.

10. The assembly of claim 1, wherein: said first tab member is oriented to extend in a first direction, said second tab member is oriented to extend in a second direction, and said first direction is perpendicular to said second direction.

11. The assembly of claim 2, wherein said internally threaded bore is defined in said guide structure.

12. A miter saw assembly, comprising:
a base having a generally horizontal workpiece support surface that defines a plane P1;
a fence supported by said base and having a generally vertical workpiece support surface that defines a plane P2;
a cutting tool operable to cut a workpiece positioned on said generally horizontal workpiece support surface; and
a stop structure attached to said base and including a first tab member and a second tab member that are spaced apart from each other,
wherein said stop structure is positionable at a first position in which (i) said first tab member is at least partially located above said plane P1, (ii) all of said second tab member is positioned below said plane P1, and (iii) all of said first tab member is positioned on a first side of said plane P2,
wherein said stop structure is further positionable at a second position in which (i) said second tab member is at least partially located above said plane P1, and (ii) all of said first tab member is positioned below said plane P1, and
wherein said stop structure is further positionable at a third position in which (i) said first tab member is at least partially located above said plane P1, (ii) all of said second tab is positioned below said plane P1, and (iii) said first tab member is at least partially positioned on a second side of said plane P2 which is opposite to said first side of said plane P2, wherein said stop structure further includes an elongate body, said elongate body has an elongate slot defined therein, and said elongate slot is interposed between said first tab member and said second tab member.

13. The assembly of claim 12, wherein:
said elongate body has a first side and a second side that is opposite to said first side of said elongate body,
said first tab member extends from said first side of said elongate body, and
said second tab member extends from said second side of said elongate body.

14. The assembly of claim 12, further comprising an attachment member securable to said base, wherein:
said attachment member extends through said elongate slot when said attachment member is secured to said base.

15. The assembly of claim 14, wherein:
said base has an internally threaded bore defined therein, and
said attachment member includes an externally threaded shaft configured to be meshly received within said internally threaded bore.

16. The assembly of claim 12, wherein:
said base further has a guide structure,
said stop structure defines an elongate channel, and
said guide structure is located within said elongate channel during linear movement of said stop structure.

17. The assembly of claim 16, wherein said guide structure is spaced apart from said elongate channel during pivoting movement of said stop structure in relation to said base.

18. The assembly of claim 12, wherein movement between said third position of said stop structure and said first position of said stop structure includes linear movement of said stop structure.

19. The assembly of claim 18, wherein movement between said third position of said stop structure and said second position of said stop structure includes pivoting movement of said stop structure.

20. The assembly of claim 14, wherein said attachment member is supported by said base continuously during the entire movement of said stop structure from said first position to said second position.

21. The assembly of claim 14, wherein said attachment member moves in relation to said slot in response to movement of said stop structure from said first position to said second position.

22. The assembly of claim 12, wherein: said first tab member is oriented to extend in a first direction, said second tab member is oriented to extend in a second direction, and said first direction is perpendicular to said second direction.

23. A miter saw assembly, comprising:
a base having a first workpiece support surface that defines a plane P1;
a fence supported by said base and having a second workpiece support surface;
a cutting tool operable to cut a workpiece positioned on said first workpiece support surface;
a stop structure defining a slot therein and including a first tab member and a second tab member, wherein said stop structure is movable between (i) a first position in which said first tab member is at least partially located above said plane P1 and all of said second tab member is positioned below said plane P1, and (ii) a second position in which said second tab member is at least partially located above said plane P1 and all of said first tab member is positioned below said plane P1; and an attachment member extending through said slot and secured to said base, wherein said attachment member is supported by said base continuously during the entire movement of said stop structure from said first position to said second position.

24. The assembly of claim 23, wherein said slot is interposed between said first tab member and said second tab member.

25. The assembly of claim 23, wherein:
said base further has a guide structure,
said stop structure defines an elongate channel, and
said guide structure is located within said elongate channel during linear movement of said stop structure.

26. The assembly of claim 25, wherein said guide structure is spaced apart from said elongate channel during pivoting movement of said stop structure in relation to said base.

27. The assembly of claim 23, wherein:
said second support surface of said fence defines a plane P2, and
when said stop structure is positioned at said first position, all of said first tab member is positioned on a first side of said plane P2.

28. The assembly of claim 27, wherein:
wherein said stop structure is further movable to a third position in which said first tab member is at least partially located above said plane P1 and all of said second tab member is positioned below plane P1, and when said stop structure is positioned at said third position, said first tab member is at least partially positioned on a second side of said plane P2 which is opposite to said first side of said plane P2.

29. The assembly of claim 28, wherein movement between said third position of said stop structure and said first position of said stop structure includes linear movement of said stop structure.

30. The assembly of claim 29, wherein movement between said third position of said stop structure and said second position of said stop structure includes pivoting movement of said stop structure.

31. The assembly of claim 23, wherein:
said base has an internally threaded bore defined therein;
said attachment member including an externally threaded shaft meshingly received within said internally threaded bore of said base.

32. The assembly of claim 23, wherein said attachment member moves in relation to said slot in response to movement of said stop structure from said first position to said second position.

33. The assembly of claim 23, wherein: said first tab member is oriented to extend in a first direction, said second tab member is oriented to extend in a second direction, and said first direction is perpendicular to said second direction.

* * * * *